US006185623B1

(12) United States Patent
Bailey et al.

(10) Patent No.: US 6,185,623 B1
(45) Date of Patent: *Feb. 6, 2001

(54) METHOD AND SYSTEM FOR TRIVIAL FILE TRANSFER PROTOCOL (TFTP) SUBNET BROADCAST

(75) Inventors: Scott Evan Bailey; John Wesely Fake, Jr., both of Endicott, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/965,757

(22) Filed: Nov. 7, 1997

(51) Int. Cl.⁷ .............................. G06F 15/16; G06F 15/76
(52) U.S. Cl. ................... 709/238; 709/227; 709/232; 709/238; 709/220; 713/2; 713/100
(58) Field of Search .................................. 709/226, 227, 709/232, 237, 220, 221, 222, 238; 713/1, 2, 100

(56) References Cited

U.S. PATENT DOCUMENTS

| 4,644,468 | * | 2/1987 | Doster et al. ......................... 364/200 |
| 4,958,278 | | 9/1990 | Meguro .................................. 364/200 |
| 5,142,680 | * | 8/1992 | Ottman et al. . | |
| 5,146,568 | * | 9/1992 | Flaherty et al. . | |
| 5,230,052 | | 7/1993 | Dayan et al. ......................... 395/700 |
| 5,345,558 | | 9/1994 | Opher et al. .......................... 395/200 |
| 5,361,256 | | 11/1994 | Doeringer et al. ...................... 370/60 |
| 5,390,170 | | 2/1995 | Sawant et al. ....................... 370/58.1 |
| 5,400,325 | | 3/1995 | Chatwani et al. .................... 370/60.1 |
| 5,426,637 | * | 6/1995 | Derby et al. . | |
| 5,454,078 | | 9/1995 | Heimsoth et al. ................. 395/100.1 |

(List continued on next page.)

FOREIGN PATENT DOCUMENTS 6-168198    6/1994   (JP) ................................ G06F/13/00

OTHER PUBLICATIONS

K. Sollins, RFC 1350, MIT, 1–10, Jul., 1993.*
W. Polites and W. Wollman, RFC 1986, MITRE, 1–19, Aug. 1996.*
A. Emberson, "TFTP Multicast Option", *IAB Internet Engineering Task Force Request for Comments (RFC)* 2090, http://www.internic.net, Feb. 1997.
"Methodology for Avoidance of Transmission of Routing Information on Transmission Control Protocol/Internet Protocol Network" *IBM Technical Disclosure Bulletin ( TDB)*, Nov. 1996, pp. 13–15.
"Remote Program Load of a Diskless Initial Microcode Load Computer System", *IBM TDB*, Dec. 1992, p. 250.
"Remote Initial Program Load of a Diskless Computing Device via a Standard Serial or Parallel Port", *IBM TDB*, Mar. 1992, pp. 211–213.

(List continued on next page.)

Primary Examiner—Mark H. Rinehart
Assistant Examiner—Stephen Willett
(74) Attorney, Agent, or Firm—Shelley M Beckstrand

(57) ABSTRACT

Subnet directed broadcasts for initial program load of network stations are not gated by clients on a slower subnet and changes in the source IP address to accommodate multiple IOPs and load balancing are permitted. A subnet broadcast server transfers a datagram including the load program together with a subnet broadcast identifier and source port identifier to client network stations on a subnet basis. Routers at subnets not matching the subnet broadcast identifier unicast the datagram to a next gateway; and routers at broadcast identifier matching subnets data link layer broadcast unicasted datagrams from intervening subnets to all neighbors on the matching subnet while disregarding forwarding this data link layer broadcast to any adjoining subnets.

18 Claims, 18 Drawing Sheets

U.S. PATENT DOCUMENTS

| | | | |
|---|---|---|---|
| 5,463,735 | | 10/1995 | Pascucci et al. ............... 395/200.1 |
| 5,515,072 | | 5/1996 | Yanai ................................. 345/92 |
| 5,519,707 | | 5/1996 | Subramanian et al. ........... 370/94.2 |
| 5,539,745 | * | 7/1996 | Chang et al. ..................... 370/85.13 |
| 5,553,083 | * | 9/1996 | Miller ................................ 371/32 |
| 5,577,210 | | 11/1996 | Abdous et al. ................... 395/200.1 |
| 5,608,726 | | 3/1997 | Virgile .............................. 370/401 |
| 5,612,959 | | 3/1997 | Takase et al. ..................... 370/390 |
| 5,634,011 | * | 5/1997 | Auerbach et al. ................ 395/200.15 |
| 5,638,377 | | 6/1997 | Quinquis et al. ................. 370/392 |
| 5,727,002 | * | 3/1998 | Miller et al. ...................... 371/32 |
| 5,752,003 | * | 5/1998 | Hart .................................. 395/500 |
| 5,793,758 | * | 8/1998 | Penners ............................ 370/342 |
| 5,818,838 | * | 10/1998 | Backes et al. .................... 370/390 |
| 5,819,042 | * | 10/1998 | Hansen ............................. 709/222 |
| 5,822,523 | * | 10/1998 | Rothschild et al. ............. 395/200.17 |
| 5,822,582 | * | 10/1998 | Doragh et al. . | 
| 5,838,907 | * | 11/1998 | Hansen . |
| 5,842,011 | * | 11/1998 | Basu . |
| 5,870,554 | * | 2/1999 | Grossman et al. ................ 709/232 |
| 5,872,968 | * | 2/1999 | Knoz et al. . |
| 5,875,306 | * | 2/1999 | Bereiter . |
| 5,884,074 | * | 3/1999 | Maeda et al. . |
| 5,887,164 | * | 3/1999 | Gupta . |
| 5,918,016 | * | 6/1999 | Brewer et al. . |
| 5,960,175 | * | 9/1999 | Grossman et al. ................ 709/232 |
| 5,974,547 | * | 10/1999 | Klimenko ......................... 713/2 |
| 6,009,474 | * | 12/1999 | Lu et al. ........................... 709/245 |

OTHER PUBLICATIONS

Lee Johg–kun. "Reduction Rules of Petri Nets for Verification of the Communication Protocol", *IEEE Catalogue No. 95TH8061*, undated.

Mott, J.M. "Network IPL without a TFTPD Server", *IBM TDB*, v. 37, n. 2B, Feb. 1994, pp. 195–198.

Rigney, S. "Solve the Address Mess", *PC Magazine*, n. 5, v. 16, Mar. 4, 1997.

"DHCP As Management Aid—Software Will Automate IP Address Assignments and Reduce Potential Conflicts", *Communications Week*, Nov. 11, 1996, p. 5.

Giles, R. "The Internet Access Dilemma", *Network VAR*, n. 7, v. 4, Jul. 1996, p. 22(8).

Lin, C. "Routers In All Places", *PC Magazine*, n. 10, v. 15, May 28, 1996.

Baker, S. "Desktop TCP/IP's Destiny", *LAN Magazine*, Oct. 1995, p. 50(6).

Garfinkel, S. "Internet–to–WAN Plans? Fire Wall Required", *Windows Sources*, n. 9, v. 3, Sep. 1995, p. 88(3).

Witt, M. "Running TCP/IP Over ATM Networks", *Telecommunications*, No. 7, v. 29, Jul. 1995, p. 53(4).

Chacon, M. "NT: Older and Wiser", *LAN Magazine*, No. 6, v. 10, Jun. 1995, p. 51(4).

Kessler, G. "Build Great Firewalls", *Network VAR*, No. 6, v. 3, Jun. 1995, p. 29(5).

Watterson, K. "60 Solutions to the Cross–Platform Blues", *Windows Sources*, n. 8, v. 2, Aug. 1994, p. 110(11).

Podnar, T. "A New Look At Windows: InterCon Systems' TCP/Connect II Proves It Is Clearly More Than Just Another TCP/IP Package for Windows", *LAN Computing*, n. 5, v. 5, May 1994, p. 23(2).

Baker, S. "It's A Stretch", *LAN Magazine*, No. 4, v. 9, Apr. 1994, p. 79(11).

* cited by examiner

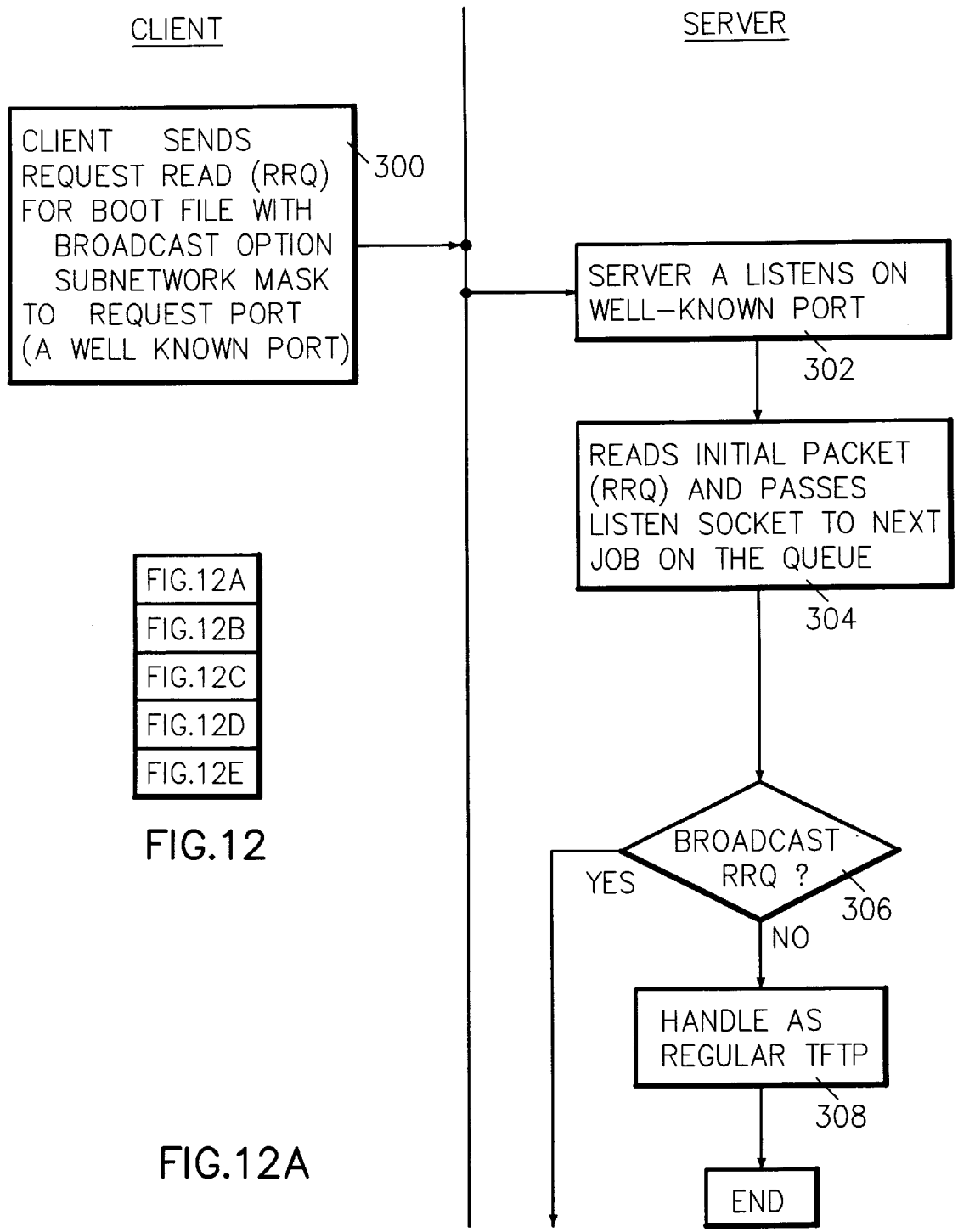

METHOD AND SYSTEM FOR TRIVIAL FILE TRANSFER PROTOCOL (TFTP) SUBNET BROADCAST

BACKGROUND OF THE INVENTION

1. Technical Field of the Invention

This invention pertains to file transfer to multiple clients. More particularly, it pertains to subnet directed Trivial File Transfer Protocol (TFTP) broadcasts, such as for initial program load of network stations; and further to subnet directed TFTP broadcasts not gated by clients on a slower subnet path while allowing changes in the source IP address to accommodate multiple IOPs and load balancing.

2. Background Art

Diskless network stations use Trivial File Transfer Protocol (TFTP) to load their initial program. This requires each station to request the load with a separate request. The server in turn transmits the load file using a dedicated process. During peak hours when potentially hundreds of workstations could be requesting their initial program loads, server and network overloads cause long delays in initializing, or booting, the network stations.

For example, in the IBM AS/400 system, when more than six network stations request their boot programs simultaneously, the current TFTP server starts six or more separate jobs to service them. This currently drives the network interface driver card to near 100% utilization, resulting in subsequent requests being deferred until the current requests are satisfied. Furthermore, when the IBM AS/400 system is handling all six jobs, the network bandwidth is reduced by about 50%, thus impacting other stations already on the network.

RFC 2090 suggests a possible solution to this problem by multicasting the load programs to all network stations that join a multicast group. (See IAB Internet Engineering Task Force (IETF) Request for Comments (RFC) 2090 "Trivial File Transfer Protocol (TFTP) Multicast Option" available on the internet at url: http://www.internic.net.) This requires that all routers support multicast functions, or doesn't accommodate those that don't. When this solution is used in a subnetted network, all clients are gated by the master client regardless of the rates of transfer of other network stations. This problem becomes acute when a network station on a remote, slower network becomes the master for the multicast group. Furthermore, RFC 2090 suggests verifying the server Internet Protocol (IP) address from which data is received. When the IP address from which the packet is received changes due to dynamic routing, the transfer may fail, requiring a rerequest by the client.

It is an object of the invention to provide an improved file transfer protocol to multiple clients.

It is an object of the invention to provide an improved file transfer protocol which allows the source IP address to vary.

It is an object of the invention to provide an improved file transfer protocol to multiple clients which allows the source IP address to vary to accommodate multiple IOPS and load balancing.

It is a further object of the invention to provide for file transfer on a subnet basis.

It is a further object of the invention to provide for file transfer on a subnet basis so as to minimize file transfer rates on a particular subnet, there being no gating by a client on a slower subnet path.

It is a further object of the invention to reduce network traffic on intervening hops. Intervening hops are networks separating the network to which the host is connected from the network to which a client is connected.

SUMMARY OF THE INVENTION

Method and system for booting diskless workstations by subnet broadcasting load programs to all network stations that join a subnet broadcast file group. A subnet broadcast server transfers files using datagrams, which contains a subnet broadcast identifier and source port identifier, to client network stations on a subnet basis. Routers at subnets not matching the subnet broadcast identifier unicast the datagram to the next router; and routers at broadcast identifier matching subnets data link layer broadcast the received unicasted datagrams from intervening subnets to all neighbors on the matching subnet while disregarding forwarding this data link layer broadcast to any adjoining subnets.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 12A–12E, arranged as shown in FIG. 12, are a process flow diagram of the method executed for a client to request a broadcast and establish itself as either a master client or a passive client.

BEST MODE FOR CARRYING OUT THE INVENTION

In accordance with the invention, a method and system are provided for booting diskless workstations by broadcasting (transferring or sending in parallel) load programs (files) to all network stations that join a broadcast file transfer group. A Subnet Broadcast Trivial File Transfer Protocol (SBTFTP) server handles the file transfer to client network stations on a subnet basis, thereby minimizing file transfer rates on a particular subnet, there being no gating by a client on a slower subnet path. A SBTFTP data packet includes a Subnet Broadcast Identifier (SBI) which along with the source's port uniquely distinguishes a file transfer from a particular (SBTFTP) server, thus allowing the source's address to vary. Hops (subnets not matching the broadcast subnet) unicast the datagram to the next gateway; and routers connected to the broadcast subnet destination broadcast unicasted datagrams from an intervening subnet to all neighbors on the subnet using a data link layer broadcast while disregarding forwarding this data link broadcast to any adjoining subnets.

With the great number of potential network station terminals that could be started in parallel, especially during peak hours and/or power-up situations, a TFTP server may become quickly inundated with read requests on the initial boot kernel. In accordance with this invention, this is handled by using a "send to all" solution which is an improvement on that described in RFC 2090, "TFTP Multicast Option", by A. Emberson.

Intranet systems, i.e. company systems, include both logical and physical networks. The larger logical network is broken down into subnets which link the various physical token rings, ethernets, and so forth, into the larger logical network. These physical networks can be joined by either bridges or routers. Bridges are used to link physical networks if they consist of the same physical medium and can be linked at the MAC layer. Routers are used to link physical networks if they consist of dissimilar physical mediums (involving a medium change from, for example, token ring to ethernet), and always transfer data at the IP layer. It is at the router boundaries where the subnets of a logical network are defined.

There are several classes of broadcasting, as specified in RFC 919. These include broadcasting (1) at the data link layer; (2) at the local net layer using the IP layer; and (3) directly to remote IP networks (referred to as the letter bomb.)

Figure 1:
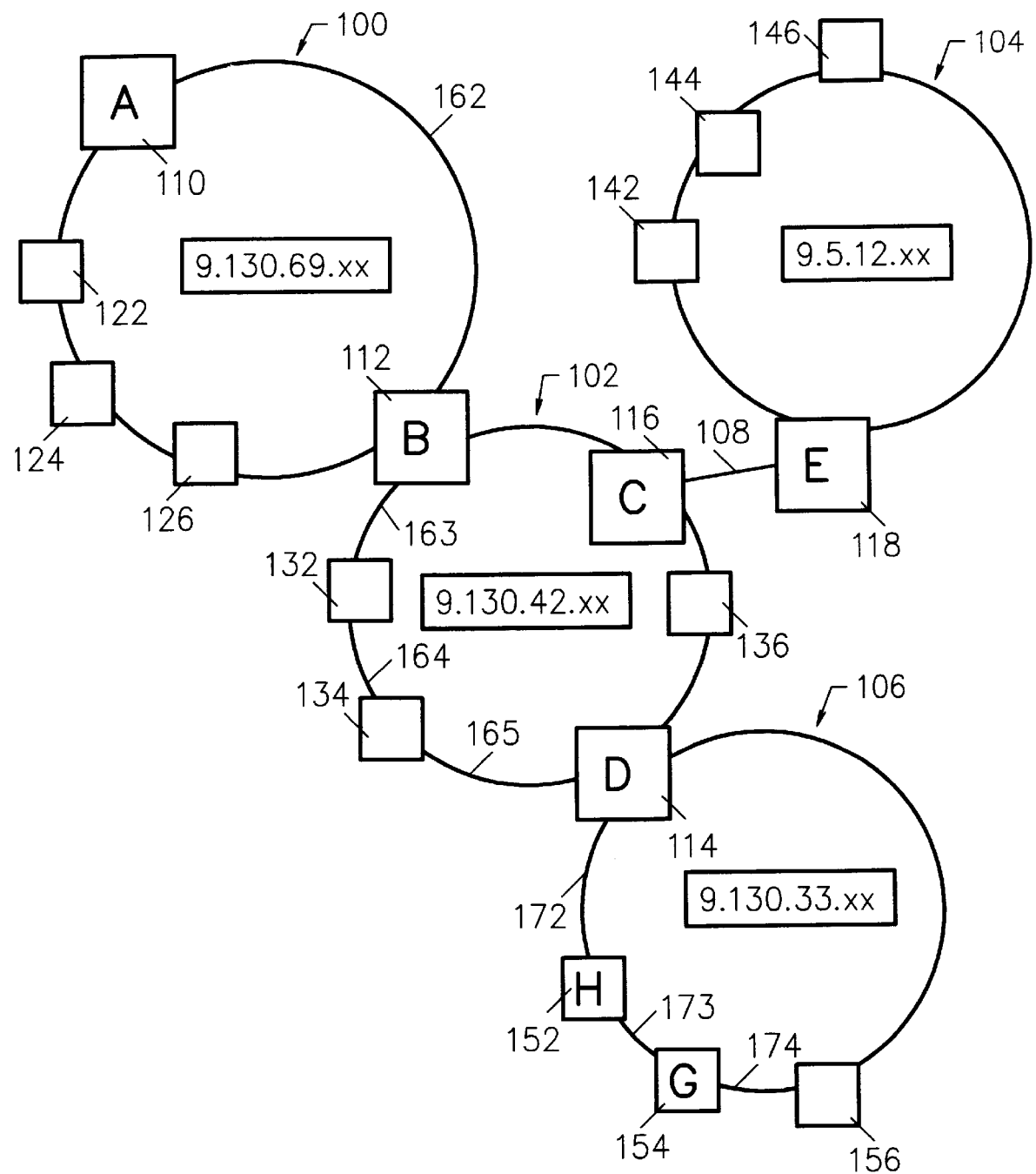
FIG. 1 is a system diagram of a network including a plurality of subnets.

Referring to FIG. 1, a collection of subnets includes subnets 100, 102, 104 and 106, having subnet addresses or identifiers 9.130.69.xx, 9.130.42.xx, 9.5.12.xx, and 9.130.33.xx, respectively. Host TFTP server 110 is illustrated as residing on subnet 100. Router B 112 links subnets 100 and 102; router D 114 links subnets 102 and 106; router C 116 on subnet 102 and router E 118 on subnet 104 link subnets 102 and 104 over remote link 108. Network station clients on subnet 100 include clients 122, 124 and 126; on subnet 102 include clients 132, 134 and 136; on subnet 104 include clients 142, 144 and 146; and on subnet 106 include clients 152, 154 and 156. Path 162–165 represents a unicast from server A 110 to router B 112 and thence to router D 114. Path 172–174 represents a data packet broadcast from router 114 to the data link layer of subnet 106 where it is received by three clients 152, 154 and 156.

With the notion of subnetting as discussed above, there is also a subnet directed broadcast. In accordance with this invention, in a subnet directed broadcast, host server 110 determines the subnet 106 on which are located multiple clients 152, 154, 156 and broadcasts the datagram to that specific subnet 106. All hops (that is, subnets 102 not matching the broadcast subnet 106) unicast the datagram to the next router 114. When a router 114 which is connected to the broadcast subnet 106 destination receives an unicasted datagram from an intervening subnet 102, it broadcasts it to all the neighbors 152, 154, 156 on the subnet 106 using a data link layer broadcast. Any gateway router on this subnet 106 (not shown, but equivalent to gateway router C 116 on subnet 102) disregards forwarding this data link broadcast to any adjoining subnets (not shown, but equivalent to subnet 104.)

Referring to FIGS. 2 through 6, the formats of TFTP packet commands 180 are illustrated. In FIGS. 7 through 10, modifications to the formats of FIGS. 2 through 5 for the subnet broadcast options are illustrated.

Figure 11:
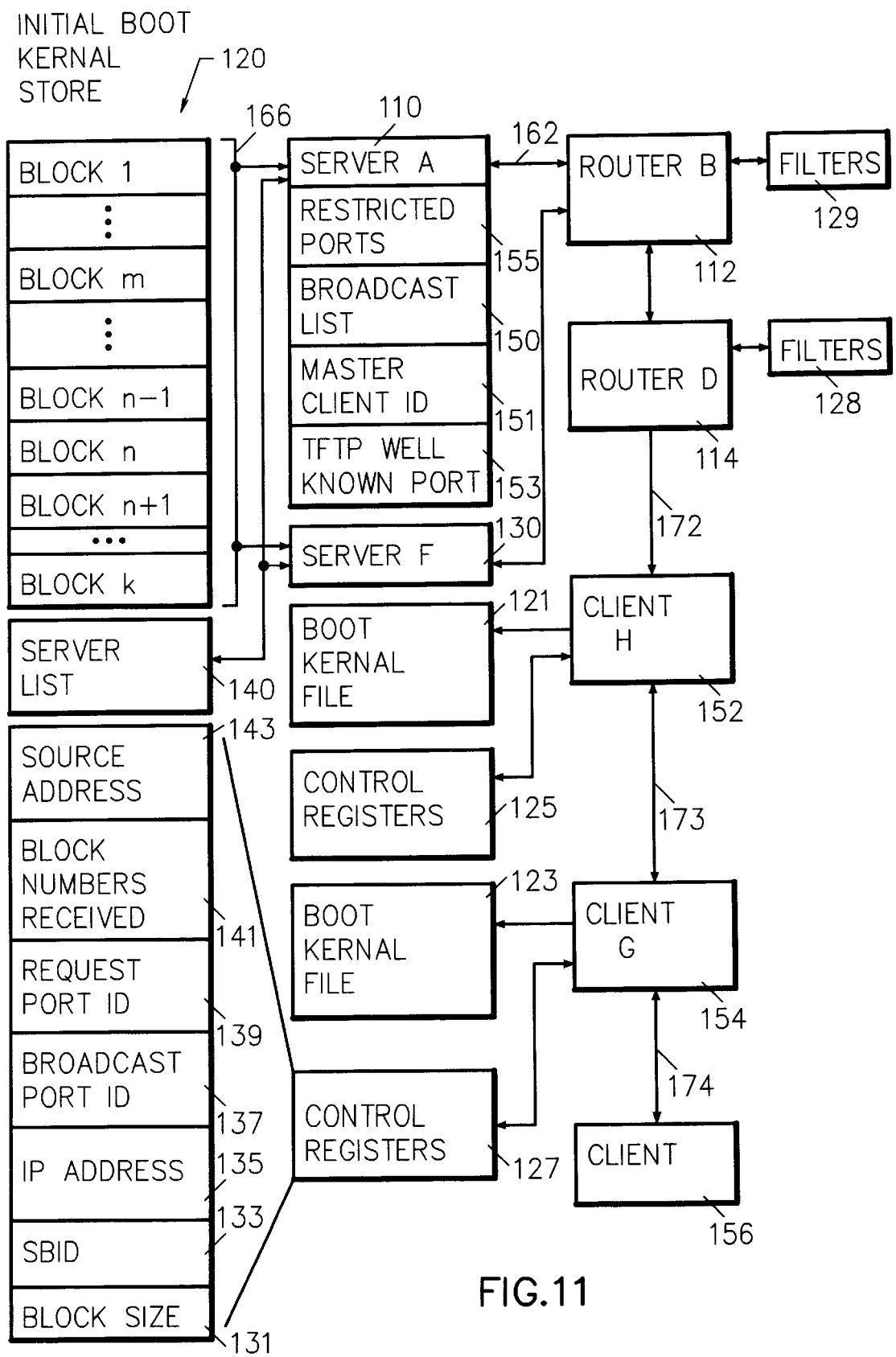
FIG. 11 is a system diagram illustrating in greater detail a portion of the network of FIG. 1.
Figure 12B:
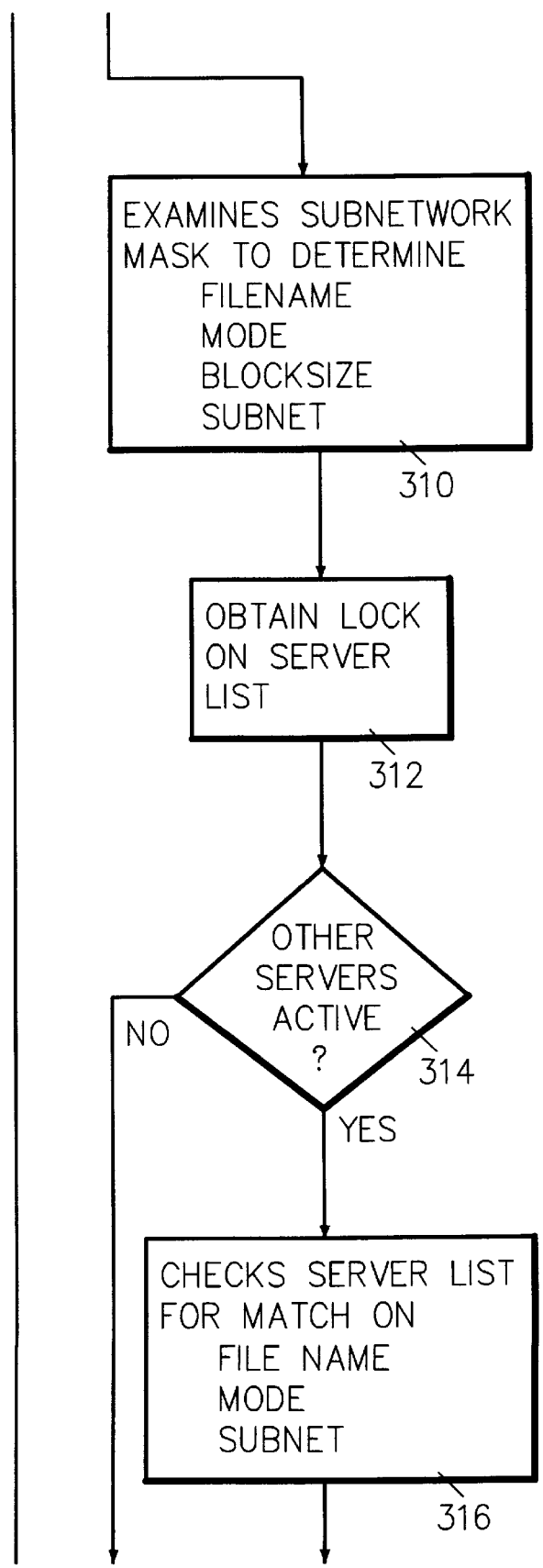
Figure 12C:
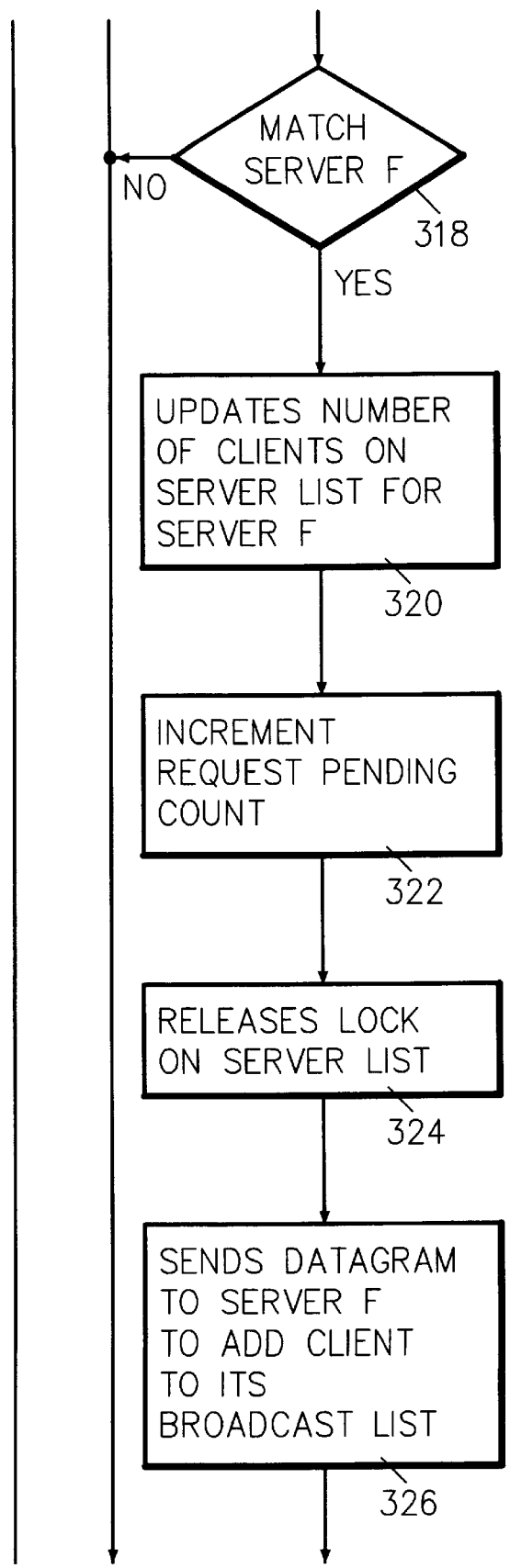
Figure 12D:
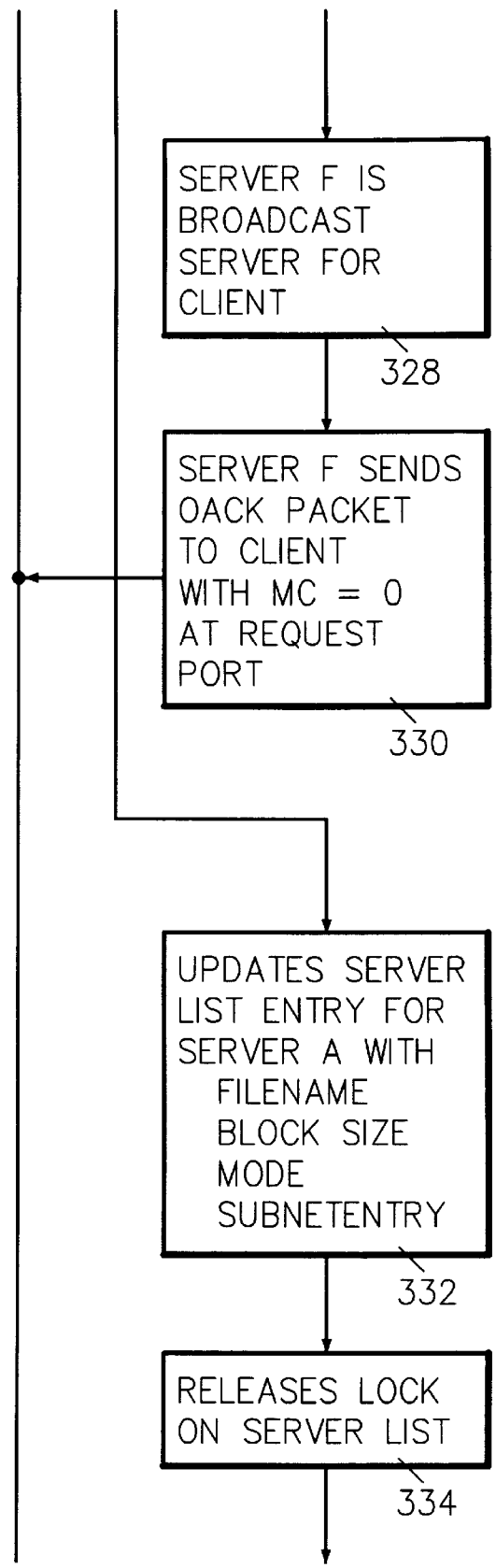
Figure 12E:
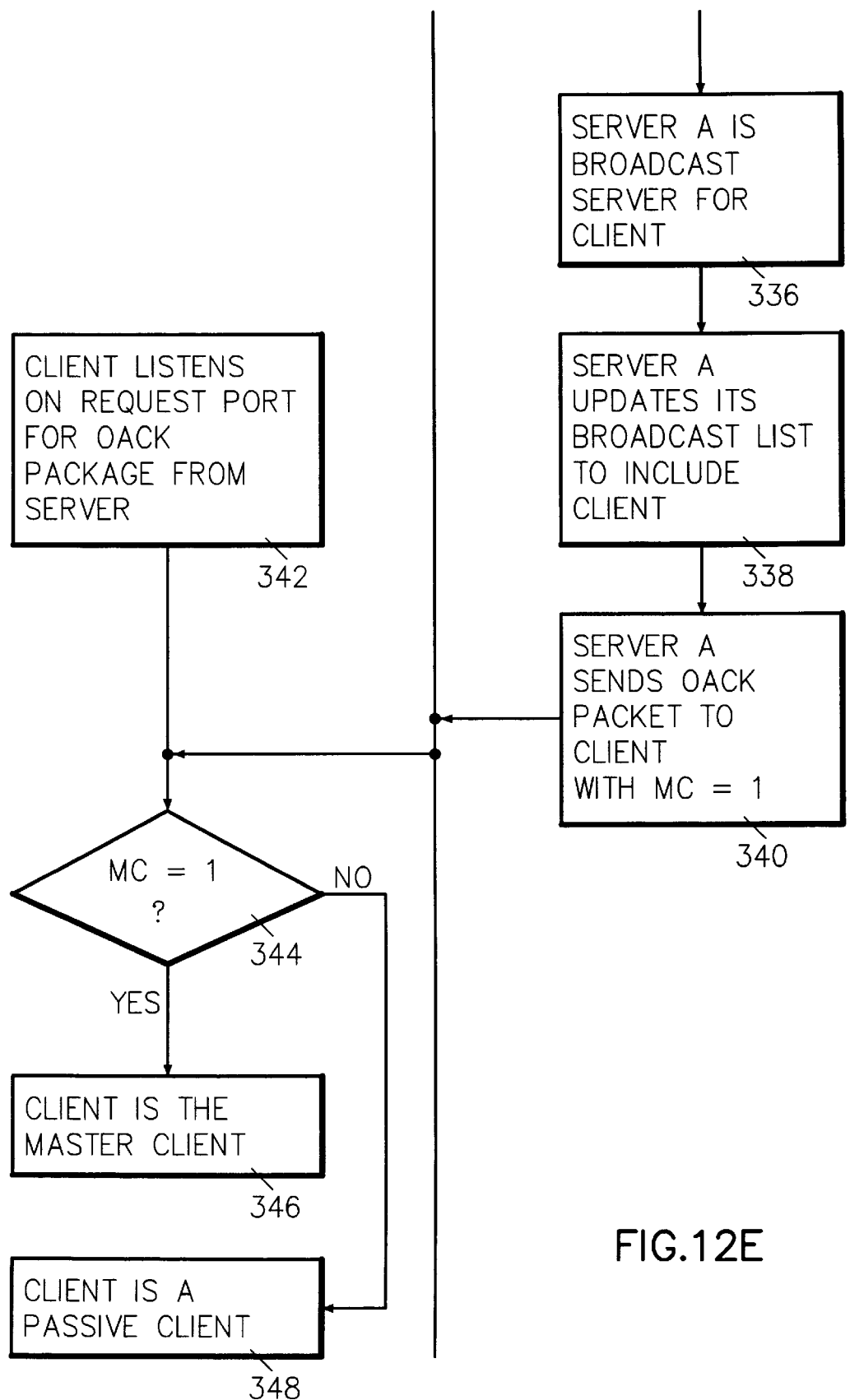

Referring to FIG. 11, the system of FIG. 1 is shown in greater detail. Store 120 at server 110 contains the initial boot kernal file, comprising blocks 1 through k, with block n designating the last block transmitted from store 120. Server 110 maintains several control registers, among them restricted ports identifiers 155, TFTP well known port pool 153, broadcast list 150, and master client identifier 151. A second server 130 may also access store 120, or a separate store also containing the initial boot kernal. Routers 112 and 114 access filters 129, 128, respectively. Clients 152, 154, and 156 each contain a storage 121, 123 for storing the boot kernal file as it is received from store 120; and a plurality of control registers 125, 127, including block size register 131, subnet broadcast identifier (SBID) register 133, IP address register 135, broadcast port identifier 137, request port identifier 139, block numbers received file 141 and source address register 143.

Figure 2:
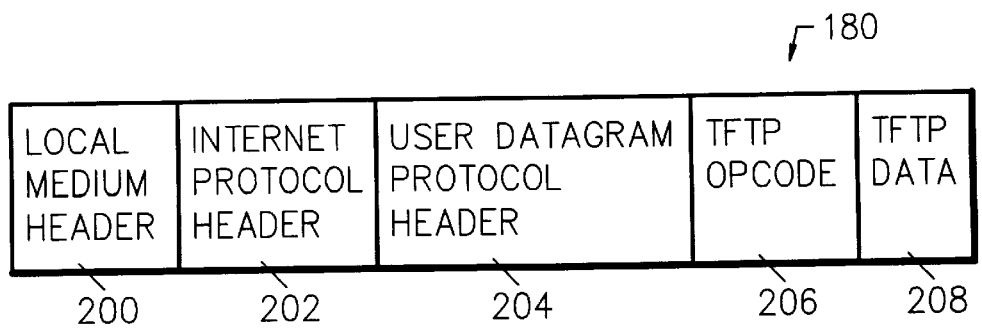
FIG. 2 illustrates the base command format for various commands used by AS/400 TFTP and broadcast TFTP.

Referring further to FIG. 2, a TFTP packet command 180 includes a local medium header field 200, internet protocol header field 202, user datagram protocol header 204, TFTP opcode field 206 and TFTP data field 208.

Figure 3:
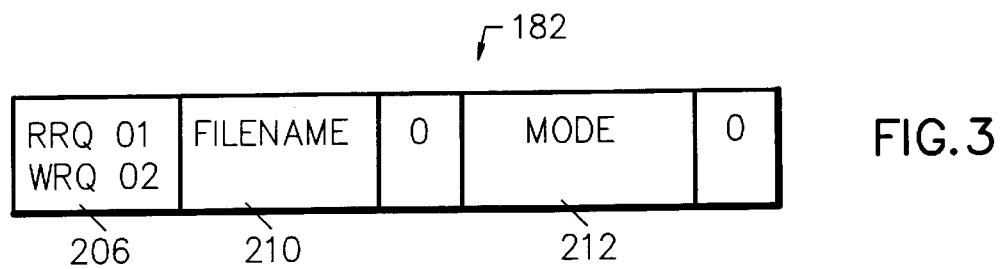
FIG. 3 illustrates the format of the TFTP opcode and TFTP data fields of the TFTP read request/write request (RRQ/WRQ) command.

Referring to FIG. 3, for read request and write request commands 182, TFTP opcode field 206 is set to 01 for read request (RRQ) and 02 for write request (WRQ), and TFTP data field 208 includes file name 210 and mode 212.

Figure 4:
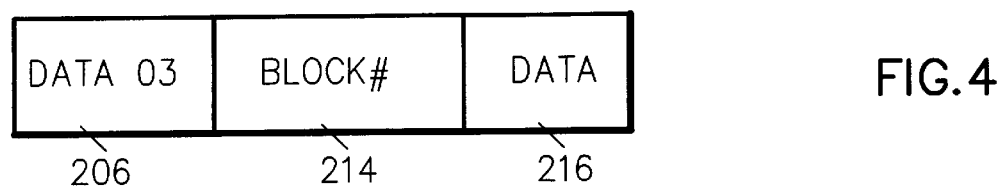
FIG. 4 illustrates the format of the opcode/data fields of the TFTP data (DATA) command.

Referring to FIG. 4, for data commands 184, TFTP opcode field 206 is set to 03, and TFTP data field 208 includes block number field 214 and data field 216.

Figure 5:
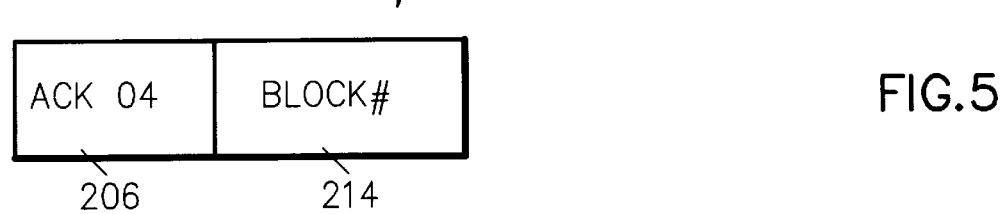
FIG. 5 illustrates the format of the opcode/data fields of the TFTP acknowledge (ACK) command.

Referring to FIG. 5, for acknowledge commands 186, TFTP opcode field 206 is set to 04, and TFTP data field 208 includes block number field 214.

Figure 6:
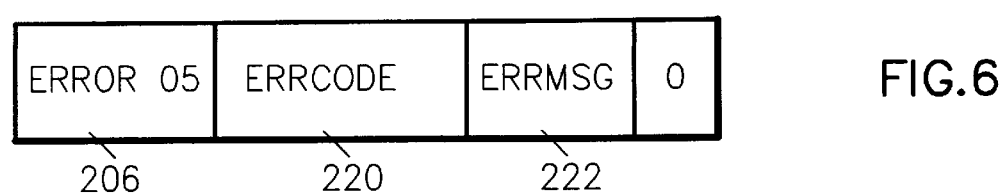
FIG. 6 illustrates the format of the opcode/data fields of the TFTP error (ERROR) command.

Referring to FIG. 6, for error commands 188, TFTP opcode field 206 is set to 05, and TFTP data field 208 includes error code field 220 and error message field 222.

Figure 7:
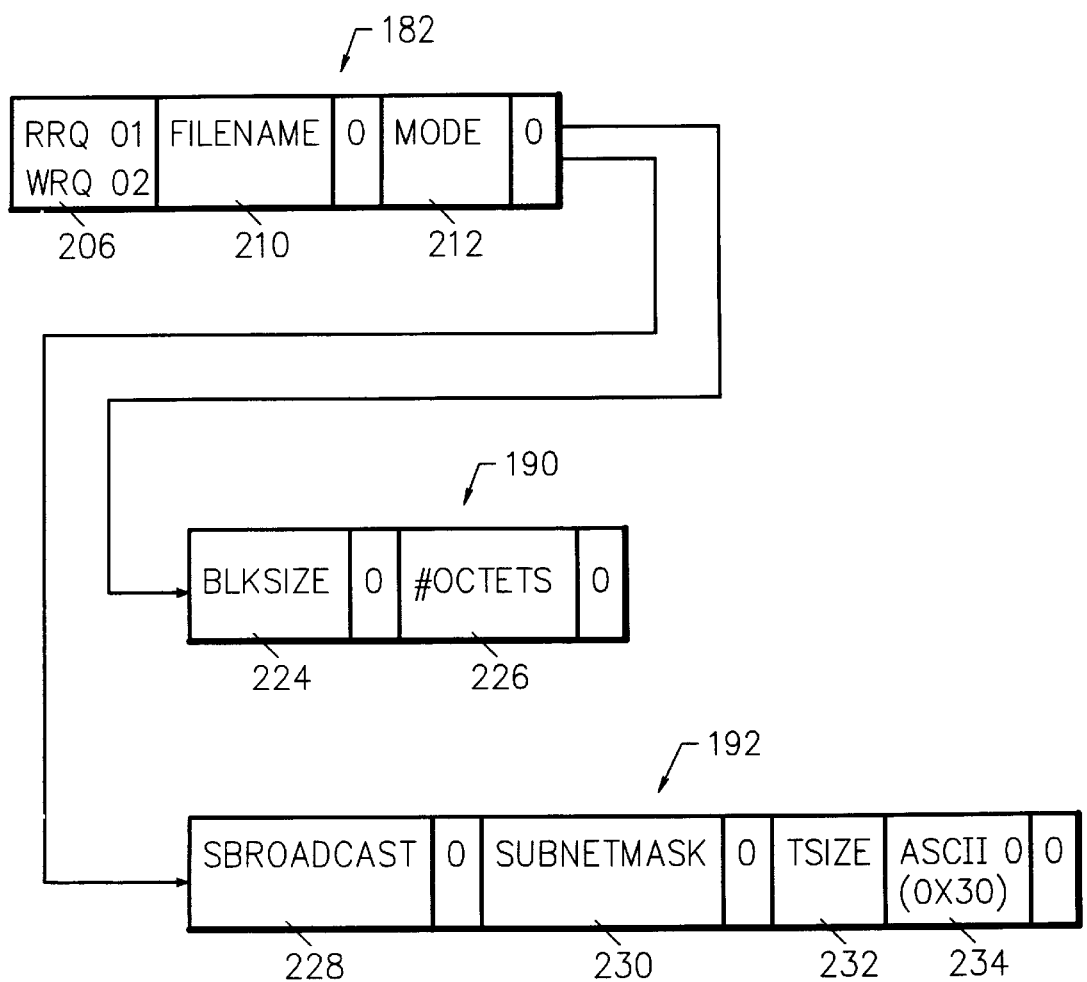
FIG. 7 illustrates the format of the opcode/data fields of the TFTP read request/write request (RRQ/WRQ) commands with extensions for the blocksize request and subnet broadcasting request.

Referring to FIG. 7, for read request and write request commands 182 in accordance with the present invention, TFTP opcode field 206 is set to 01 for read request (RRQ) and 02 for write request (WRQ); TFTP data field 208 includes file name 210 and mode 212 and (a) optionally for requesting blocksize 190, block size field 224 and number of octets field 226; or (b) optionally for requesting subnet broadcasting 192 (for RRQ, field 206=01, only), subnet broadcast (sbroadcast) field 228, subnet mask (subnetmask) field 230, TSIZE field 232 and ASCII 0 filed 234. Subnet broadcast field 228 is a case insensitive, NULL-terminated field specifying the subnet broadcast option. Subnet mask field 230 is the subnet mask of the subnet to which the requested file is to broadcast, specified in dotted decimal notation as a NULL terminated ASCII string. Subnet broadcast address 228 is derived from the client's source address 143 and the subnet mask 230 the client sends as part of the request (FIG. 7.) Subnetwork mask 230, also referred to as the network mask 230, is configured on the network station, say client 154.

Figure 16:
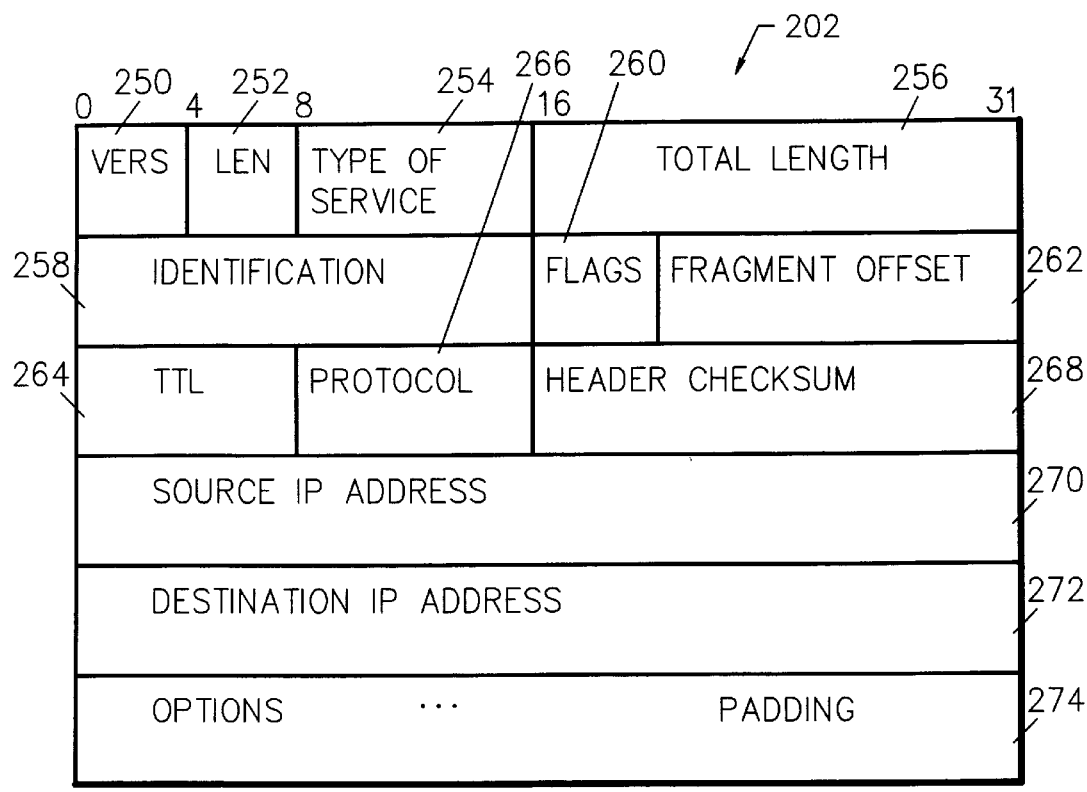
FIG. 16 is a diagram illustrating the format of the IP header of FIG. 2.

Referring to FIG. 16, IP header 202 includes version 250, length 252, type of service 254, total length 256, identification 258, flags 260, fragment offset 262, TTL 264, protocol 266, header checksum 268, source IP address 270, destination IP address 272, and options 274 fields. Server A 110 receives the client IP address 272 in IP header 202. A sockets interface is typically used to get the source IP address 270 from IP header 202.

TSIZE, as well as all other options 274, may be used independently of other options. For example, referring to FIGS. 8 and 9, the BLKSIZE option 224 of FIG. 8 could be used along with the SUBNET option of FIG. 9. Then, OACK 06 would include both FIGS. 8 and 9 concatenated (minus the second, redundant op code 206.)

Figure 8:
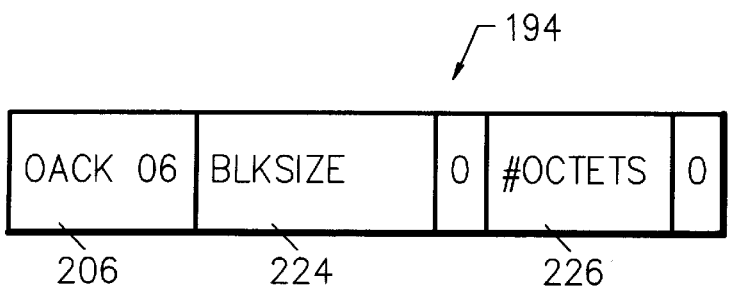
FIG. 8 illustrates the format of the opcode/data fields of the option acknowledgment (OACK) command for the blocksize option.
Figure 9:
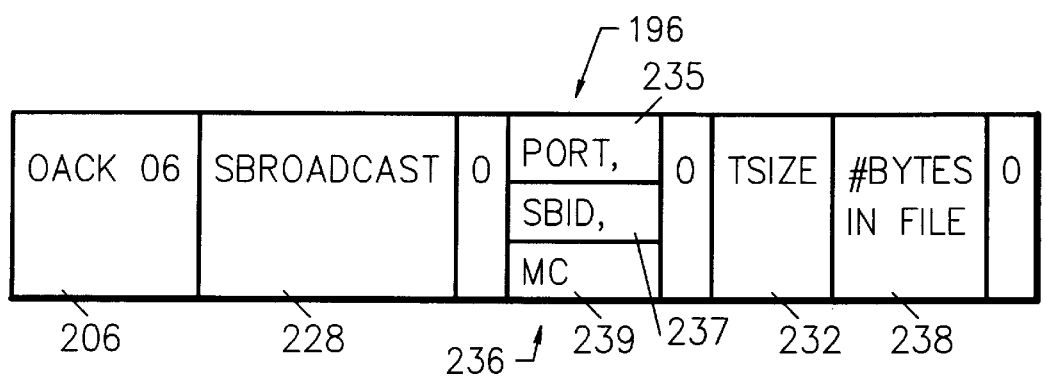
FIG. 9 illustrates the format of the opcode/data fields of the option acknowledgment (OACK) command for the subnet broadcasting option.

Referring to FIGS. 8 and 9, server 110 responds to a RRQ 182 from client 154, for example, with an OACK command 194 or 196. If server 110 is willing to accept the subnet broadcast option, it sends an option acknowledgement (OACK) command 196 including the subnet broadcast option 228, otherwise the blocksize option 224 of FIG. 8. Only requested options 274 will be included in OACK 06 field 206 if they are accepted. In FIG. 8, TFTP data field 208 includes blocksize field 224 and #octets field 226. In FIG. 9, TFTP data field 208 includes subnet broadcast field 228; in field 236 PORT field 235, SBID field 237, and MC field 239; transfer size (TSIZE) field 232 and # bytes in file field 238.

In FIG. 9, subnet broadcast field 228 is a case insensitive, null-terminated field containing "sbroadcast", an acknowledgment or acceptance of the subnet broadcast option.

PORT field 235, a field within field 236 terminated with a comma, designates the port to which packets will be broadcast on the subnet, specified as a decimal number in ASCII with valid values ranging from 0 to 65535.

SBID field 237, a field within field 236 terminated with a comma, designates the subnet broadcast identification number specified as a decimal number in ASCII with valid values ranging from 0 to 4294967295. This SBID is used in BDATA packets (see FIG. 10) to help verify the packets are for the requested transfer. Server 110 generates SBID with the intent to ensure uniqueness.

MC field 239, a field within field 236 is a NULL terminated field set to ASCII 1 to indicate the client 152, for example, is a master client, which is responsible for sending acknowledgment commands (ACKs) 186 to server 110; or to ASCII 0 to indicate client 154, for example, is not a master client, and will passively receive packets sent by server 110.

Figure 17:
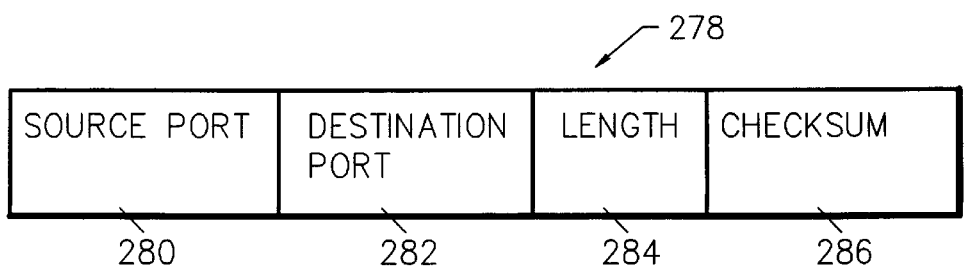
FIG. 17 is a diagram illustrating the format of a UPD header.

Referring to FIG. 17, the port from which the server sends the OACK packet is contained in the UDPi header 278, which includes source port field 280, destination port field 282, length field 284 and checksum field 286. Port 235 (FIG. 9) is the port on which client 154 listens to receive BDATA packets 198.

Client 154 stores in broadcast port ID register 137 the port 235 from which the server sends the OACK packet 196 for verification of future packets. After OACK 196 is received by client 154, client 154 sends back an ACK 186 for packet 0. This first ACK 186 is sent whether or not client 154 is the master client. As with non-subnet broadcast transfers, this ACK 186 indicates acceptance of the options specified in the OACK 196. If client 154 does not accept the options specified in OACK 196, it must send an error (ERR) packet 188 to terminate the requested transfer. The ACK 186 by the first client, which is the initial master client 154, will indicate to server 110 that client 154 wants the first packet. ACK packets 186 from master client 154 will now be considered both (1) an acknowledgment of the previous BDATA packet 198 received and (2) a request for next block number n+1 from store 120, where n is the block number of the last block transmitted, that is, block 214 of ACK packet 186. Instead of DATA packets 184, server 110 sends BDATA packets 198 to the broadcast port specified in PORT field 235 of OACK 196 in the subnet broadcast version of TFTP.

Blocks from store 120 need not be requested consecutively. However, to prevent unnecessary packet 184 duplication, blocks are requested in ascending order. Server 110 ignores ACK packets 186 for block numbers 214 1 through n-1, which precede the last data block n 198 sent. This avoids the "Sorcerer's Apprentice" bug described in RFC 1123, "Requirements for Internet Hosts—Application and Support."

Master client 154 is the only client which must send ACK packets 186. All other clients 152, 156, etc. do not send packets 186 to server 110 until they become the master client, unless they are terminating their transfer. This way, master client 154 controls the blocks 198 to be broadcast from store 120.

All clients 152, 154, 156 in a subnet broadcast TFTP transfer group 106 listen on the port number specified in the OACK 196 sbroadcast option value 235. This port 235 is designated the broadcast port 137. All clients also listen on the port number 139 from which they initially made request 182. Server 110 may unicast to the port 139 from which client 154 initially made the request (assuming it is different than the broadcast port 137, 235), or it may unicast or broadcast packets 198 to the subnet 106 and the broadcast port 235.

Figure 10:
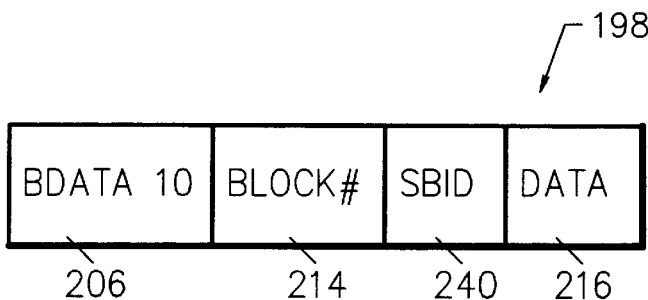
FIG. 10 illustrates the format of the opcode/data fields of the broadcast data (BDATA) command.

Referring further to FIG. 10, BDATA block 198 (TFTP OPCODE field 206 equals 10), includes in TFTP data field 208 block number field 214, SBID field 240 and data field 216.

Block# 214 is the block number n of data being sent. This is the same as the block number field 214 of DATA packets 184; that is, a two byte integer in network byte order. The last block number 214 can also be determined by using transfer size option field 232.

SBID 240 is the four byte integer form of the subnet broadcast identifier 237 in network byte order. This is stored in register 133 and must match the value of SBID 237 sent in the OACK response 196 for the sbroadcast option converted to the four byte network byte order form.

Data 216 is the data for the current block 198 of the file being transferred from store 120 to file 121, 123 (for clients 152, 154, respectively). The length of this field is less than or equal to the block size 131 for this transfer.

Client 154 verifies that the SBID 240 in the BDATA packet 198 matches the SBID 133 sent in OACK 196 and that the port number from which packet 198 was received matches the port number 137 from which the initial server reply OACK 196 was received. Clients 154 ignore the IP address in IP header 202 for packets 198 which are received, as this could change due to dynamic route assignment. All clients 154, etc. ignore BDATA packets 198 which do not have the expected SBID 133, 240 or do not come from the expected port 137. All clients 154, etc. keep track of the block numbers 141, 214 they have received.

Master client 154 sends ACK packets 186 for blocks it receives setting block number 214 in ACK 186 to the block preceding the next block it requires, which will be the last consecutive block stored to file 123 and logged to block numbers received log 141 which is one block less than the first block which has not been received. This may include sending duplicate ACK packets 186 when client 154 receives the same block 198 multiple times due to server 110 resending BDATA packets 198 after timing out waiting for an ACK packet 186. Network station packets 186 acknowledging a BDATA packet 198 must be sent to the address and port from which the BDATA packet 198 being acknowledged was sent. Also, network station packets 186 must be sent from the port from which client 154 sent its initial request. Once master client 154 has received all the blocks 1 through k in file 120, it sends an ACK 186 with block number 214 set to the last block number k. Once server 110 receives an ACK 186 of the last block number k 214, current master client 154 is no longer considered part of the subnet broadcast group. If there are no clients (such as 152 or 156) left in the subnet broadcast group 150, the group transfer is considered complete. If there are more clients, for example client 156, in group 150, server 110 sends an OACK packet 196 to the next client 156 in the group. The OACK packet 196 sent to next client 156 includes the sbroadcast option 228, but it may have empty port 235 and SBID 237 fields, since these fields were sent to client 156 in reply to the initial client 156 request 182. Client 156 responds to the OACK packet 196 with an ACK packet 186 for the block m immediately preceding the first block required for client 156 to complete the transfer.

All clients 152, 154, 156, . . . send packets to server 110 from the address 135 and port 139 which they initially used for the request packet 182 sent to server 110. However, clients 152, 154, 156, . . . depend only on the port from which server 110 sends packets, and do not expect the address from which server 110 sends to be constant. If server 110 has multiple addresses in network (FIG. 1), the address from which the server sends may change.

Each client 152, 154, 156 terminates the transfer by sending an ACK packet 186 for the last block k or by sending an error packet 188 to server 110. This termination of a client transfer can occur at any time, even if the client is not the master client. At any point, if server 110 receives an ACK packet 186 from a client 152 other than master client 154 with a block number other than the last block number, server 110 sends another OACK packet 196 to client 152 with MC field 239 set to zero to indicate to client 152 that it is not the master client. If a client 152 other than master client 154 sends more than, say, ten erroneous ACK packets 186 server 110 ends the offending client's transfer by sending an ERROR packet 188 to the offending client 152.

If timeouts occur waiting for a response from master client 154, server 110 may switch the master client to the next client 156 in list 150 and upon completion of the transfer to the new master client 156 switch back to the previous master client 154. Master client 154 is prepared to receive an OACK packet 196 indicating it is no longer the master client and will then stop sending ACK packages 186 for BDATA blocks 198 received.

By way of summary, in accordance with the protocols of the invention:

1. One and only one client 154 will acknowledge with an ACK packet 186 a broadcast BDATA packet 198 for any one broadcast group 106. A broadcast group is a group of clients 152, 154, 156 receiving a particular broadcast 198. An exception is when a client which is not the master sends an acknowledge for the last block when it has received all the blocks.

2. The initial read request 182 is directed to the server 110 listening, in this embodiment, on the TFTP well-known port 153. The well known port number 153 for TFTP is "69".

3. The initial client, master client 154, that acknowledges the BDATA packets 198 from server 110 must send an ACK packet 186 for the last block k when it has received all the data packets 198 it requires.

4. The server 110 broadcasting packets 198 does so on a port selected from the free port pool on the pool 155 of restricted ports defined for the TFTP server. Thus, server 110 can subnet broadcast to any one subnet 102, 104 or 106 at any one time a number of file/blocksize/modes up to the amount of configured servers or defined restricted ports.

5. Server 110 matches a broadcast request 182 from a client 152, 154 or 156 on subnet 106 for a given file 210 and block size 224 and mode 212 to other servers 130 that may be broadcasting that given file 210 and block size 224 and mode 212. If none are found, server 110 becomes the new broadcasting server for that file 210/mode 212/blocksize 224 and subnet 106.

6. Server 110 may OACK 196 the request with a smaller block size 224 to utilize other existing broadcasting servers 130. Client 154 must accept the smaller blocksize 224 or go back to plain TFTP.

7. A listening controller (i.e., server) 110 places a client 152 on broadcast list (not shown, but similar to 150) for another eligible broadcasting server 130, else server 110 becomes the server. Broadcasting server 110 must remove the terminating master client 154 from the list 150 and assign a new control (i.e., master) client 151, 156.

8. Master client 154 sends an ACK 186 for the last block number k or an error packet 188 to give up control and indicate it is done receiving packets 198.

9. If master client 154 does not send an ACK 186 for the last block k within the allowed number of timeouts and retries, it is purged from the list 150 and the next client 156 is assigned as the master client 151.

10. ACK packets 180 are not broadcast but are sent to the IP address and port from which packet 180 being acknowledged was received.

11. Client 156 keeps track, as is represented by file 141, of the packets 198 it has received and the ones it does not have. It requests in ascending order the missing packets 198 when it becomes the controlling (master) client 151.

12. When a client 154 requests a subnet broadcast, a broadcast port 235 is returned in OACK 196 and stored in register 137. Client 154 then listens to any address on that port 137 and the port 139 from which the client 154 made its original request. Initial packets from file 120 may be unicasted to just a master client 151, 154 until another client 156 joins the transaction and is added to broadcast list 150. Blocks that are unicasted will still be sent in BDATA packets 198 and will have the SBID 240.

Subnet broadcast TFTP server 110 has two sets of ports it uses. The source set of ports do not have to be unique. These could be arbitrarily allocated and used. However, in accordance with another aspect of the invention, when broadcasting through routers 112, 114 which may use filters 129, 128, respectively, to block directed broadcasts, server 110 checks set 155 of restricted ports and uses only those which are reserved for the QTFTP profile. If a set of ports have been defined, only the defined set of ports will be used as source ports for broadcasting. This allows network administrators to define filter 128, 129 rules that allow network station TFTP subnet broadcasting packets to get through their routers 112, 114 while still blocking out unwanted broadcasts from any other hosts.

The destination ports for subnet broadcast TFTP server 110 is a port 153, which is in this embodiment a well-known port. The uniqueness of the sending port allows multiple file transfers from the host 110 using multiple server jobs. If two servers 110, 130 broadcast to the same subnet a collision could occur. Consequently, client 154, 156 matches the SBID in the packet and the port on which the packet was received before processing it as part of the transaction. This ensures that packets sent to the same ports are not misinterpreted by client 154, thus causing file 123 corruption. This port (number 247) is well known and is sent as 235. It is not configured.

Client 154 also ensures that the datagram is for the file (mode blocksize) by checking the SBID 133 which was originally sent as part of the OACK 196 when the client made its initial broadcast RRQ 182.

A list 140 of broadcasting servers 110, 130 is maintained in global space, such as a user space, where the current listening job and broadcasting servers 110, 130 could interrogate. Elements in each entry of this list of servers 140 include:

Filename 210: fully qualified name of file 120 to be transferred.

Mode: this will either be NET-ASCII or octet (binary), and is the same as that received in the initial RRQ command 182.

Subnet: this is the subnet 106 (i.e., 9.130.33.xx) that this server 110 is broadcasting to.

Server's IP/port: this will be used to forward requests received at one server 130 to servers 110 already broadcasting.

Requests pending: this value is incremented when a client's RRQ 182 is passed along to an already broadcasting server 110. It is decremented by the broadcasting server 110 when the forwarded request is received by the broadcasting server.

Referring to FIGS. 12A through 12E, in accordance with the invention, an exemplary process executed by a client 154 to request a broadcast and establish itself as either a master client or a passive client will next be described.

In step 300, client 154 issues a read request (RRQ) 182 with broadcast option 192.

In steps 302 and 304, server 110 listening on, for example, a well-known port reads the initial packet 180/182 and passes the listen socket to the next server job on the job queue.

In step 306, server 110 checks to see if this is a broadcast RRQ 182, 190, 192 and if so passes control to step 310. If not, in step 308 the RRQ is handled as a regular TFTP request, and further processing as a broadcast request ends.

In step 310, server 110 determines the filename 210, 120, mode 212, blocksize 131 and subnet 106.

In step 312, to obtain a lock on server list 140, server 110 issues a write lock on currently active servers and will timeout and retry if lock is not granted.

In steps 314 and 316, if the lock is granted and server 110 determines that other servers are active, in step 316 server 110 checks list 140 for match on filename, mode, and subnet. The requested block size must be greater than or equal to an active server's block size to be considered a match. The default block size is 512 if none is requested.

In steps 318, 320, 322, and 324, if server 110 matches a currently broadcasting server 130, the lock on server list 140 is released after the number of clients is updated and the request pending count is incremented.

In steps 326 and 328, server F having been identified as the broadcast server, a datagram is sent to the IP address of server 130 telling it to add this client to its list 150.

In step 330, an OACK 196 is passed to the requesting client 154 with the blocksize and subnet broadcasting information filled in; the MC bit 239 is set to 0 indicating the client is not the master.

If in step 318, server 110 doesn't find a match in server list 140, in steps 332, 334, 336 and 338 server 110, having become the subnet broadcasting server, adds the file name 210, block size 224, mode 212, and subnet 106 along with other information required to the entry in server list 140 for this server 110.

In step 340, server 110 sends OACK packet 196 with option replies including subnet broadcast option 228 with MC bit 239 set to 1 to client 154 making the RRQ 182.

Meanwhile, in step 342, client 154 has been listening for the OACK response. Upon receiving OACK 196, in step 344 client 154 determines if the MC bit 239 is set to "1". If MC is equal to "1", as is represented by step 346, client 154 has become the master client, and will in step 354 (FIG. 13A) send an ACK 186 to server 110 with the block# 214 set to "0". This ACK 186 is sent from the client's initial request IP address and port to the IP address and port from which the last server packet was received. If MC is not equal to "1", client 154 has become a passive client, and will pick up processing at steps 400 and 402 (FIG. 14A).

Referring to FIGS. 13A through 13D, in steps 376 through 380, each time broadcasting server 110 receives the acknowledgement 186 it checks the number of clients in list 150 to see if it should switch to a broadcast mode.

Further, server 110 may receive requests from a listening server 130 between the time it sends an OACK 196 packet in step 340 or a BDATA 198 packet in steps 378 or 380, indicating it should add a client 152 to its client list 150. These client entries are added to the end of list 150.

In step 378, server 110 starts unicasting the BDATA blocks 198 and in steps 382 and 364, waits for ACKs 186 from master client 154. If server 110 determines in step 376 that there is more than one client in the server's client list 150, in step 380 it broadcasts the BDATA blocks 198.

In steps 356 and 360, when master client 154 sends an ACK 186 with block number 214 for last block k, in steps 370, 372 and 374, server 110 removes client 154 from list 150 and sends an OACK 206 to the next client 152 in list 150 with MC bit 239 set to "1". This client 152, now the master client, can in steps 356, 358, 384 and 386 then request the blocks m, n it needs to complete its transfer of file 120. In step 388, client 152 checks subnet address and notes the port at which the datagram originated (the source port, or the port used by source 110.)

In step 356 and 360, when a transfer of file 120 has completed in broadcast mode to master client 154, master client 154 has received the entire file 120 to its file 121. The next client 152 on list 150, a passive client, may have joined the broadcast anywhere during the transmission of file 120, for example, at the transmission of block m.

In step 374, this client 152 then receives an OACK 196 directly to its port/IP address 139/135 registered in client list 150 with MC bit 239 set to a "1". No fields are present in the SBID 237 and port 235 portions of the string 236 ",,1". In step 354 or 358, this client 152 then sends an ACK 186 with the block number of the next block it requires minus 1. In this case, where blocks 1 through m-1 are required, block# 214 would be set to "0". When client 152 has received all blocks 1 through m-1, in step 360 it will send an ACK 186 with block# 214 set to block k, the last block of the file, to server 110.

While, in step 340, subnet broadcast identifier (SBID) 237 is returned in the first OACK 196 for a broadcast file, the source IP/port address 202 of the OACK is the port and address where the initial ACK 186 packet is sent.

If, in step 366, next client 152 has been shut down or can not respond after a suitable timeout period, in steps 370 and 372, server 110 removes it from the active list 150 and shifts the entire list 150 up and, in step 374 sends the OACK 196 to the next oldest client, say, 156. Client 156 responds in step 354 or 358 with an ACK 186 including the block# 214 of the block it wants broadcast minus one.

Referring further to FIGS. 13A through 13D, in accordance with the invention, the steps executed in passing control to a next client 152 will be further described.

In steps 380 and 364, server 110 is transferring BDATA blocks 198 and receiving ACK packets 186 from master client 154.

In steps 366, server 110 times out after sending data block 198 and receiving no ACK 186 response, or in step 368 determines that it has received an ACK 186 response from master client 154 with last block k in block# field 214.

In steps 370 and 372, server 110 obtains lock on server list 140 and decrements number of clients in its server entry in server list 140.

In step 372, server 110 shifts all clients up on its local list 150 by one element, thus deleting the old master client from its broadcast list and identifying the passive client which should be made the next master client. Server 110 then releases locks on server list 140.

In step 374, server 110 sends OACK 196 with MC bit 239 set to "1" to first client on list 150 (the new master client.)

For the special case where there is no client left in list 150, server 110 will clear its own local client list 150 and delete its entry in server list 140, and release its lock on server list 140.

Figure 14A:
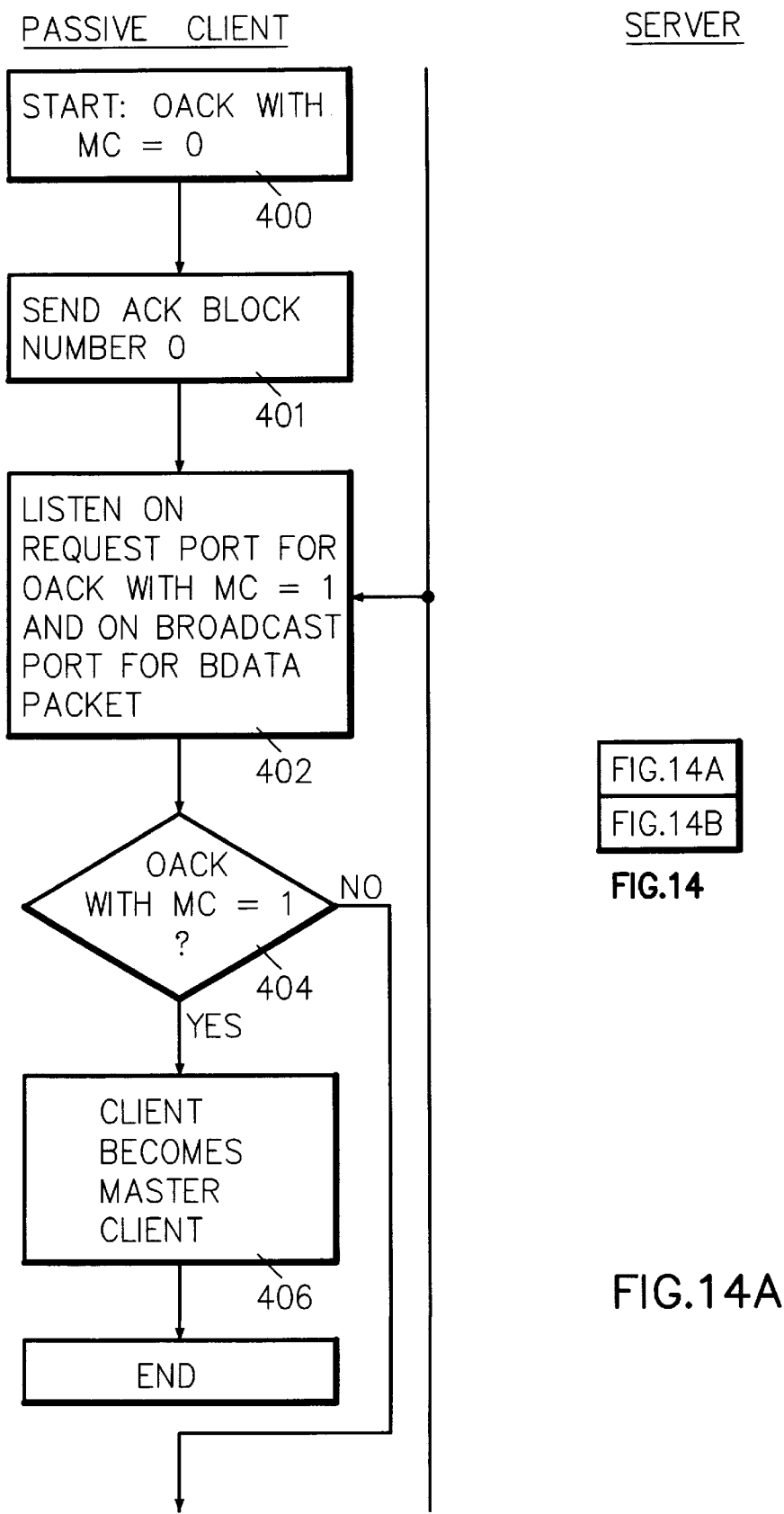
FIGS. 14A–14B, arranged as shown in FIG. 14, are a process flow diagram of the method executed by a passive client to join a broadcast group and receive a partial boot file, and thereafter to become the master client and receive the remainder of the boot file.
Figure 14B:
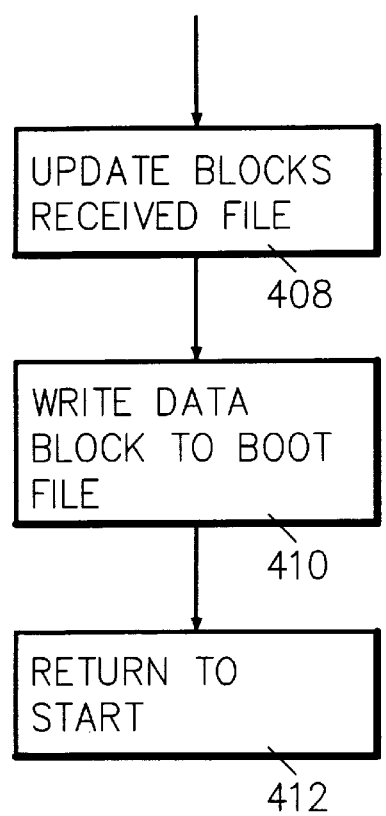

Referring to FIGS. 14A and 14B, a client is determined to be a passive broadcast client upon receiving an OACK packet with MC=0. In step 401, client sends an ACK packet with block number 0.

Figure 13A:
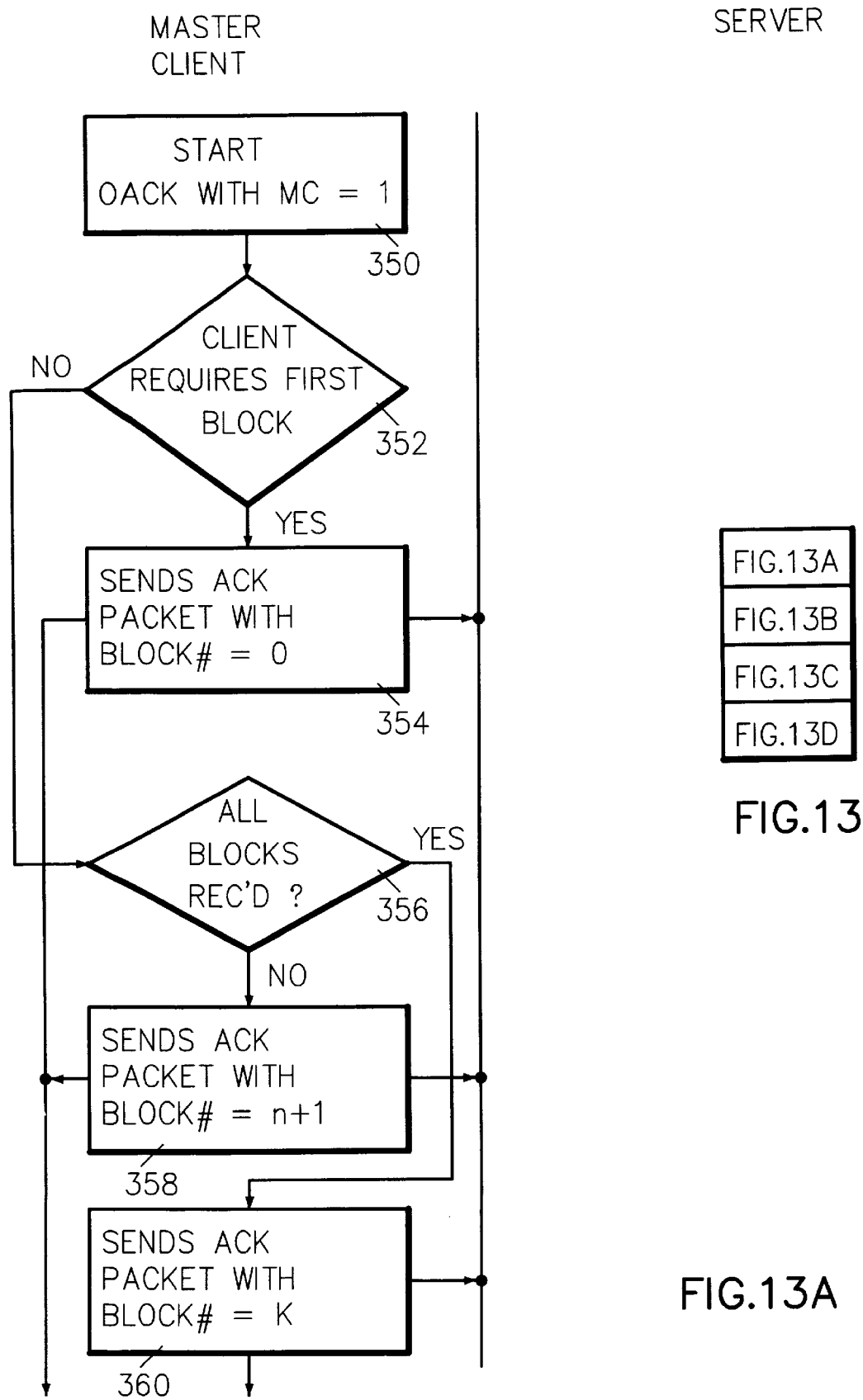
FIGS. 13A–13D, arranged as shown in FIG. 13, are a process flow diagram of the method executed by a master client to receive a boot file from a server and thereafter to relinquish control.
Figure 13B:
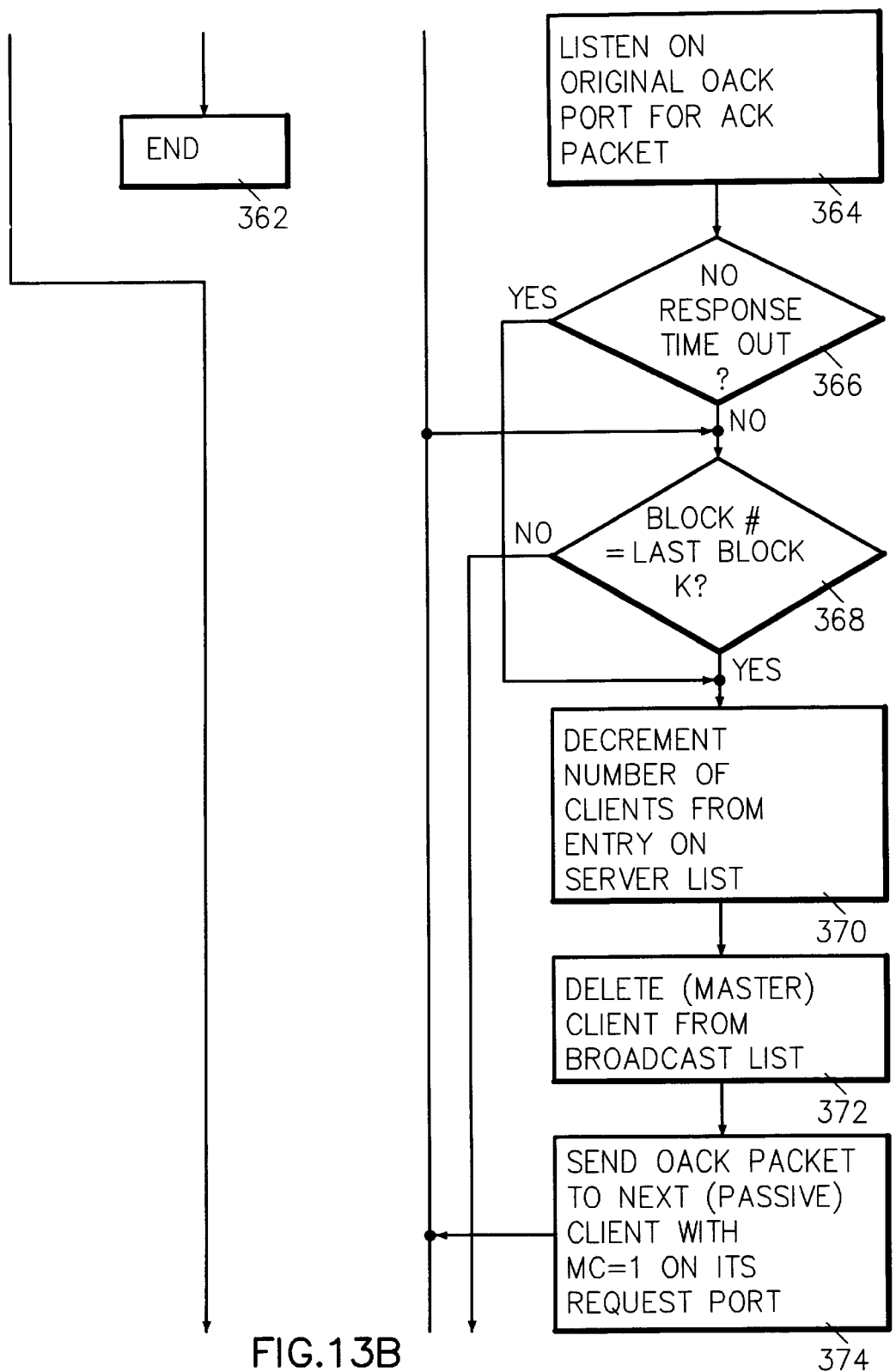
Figure 13C:
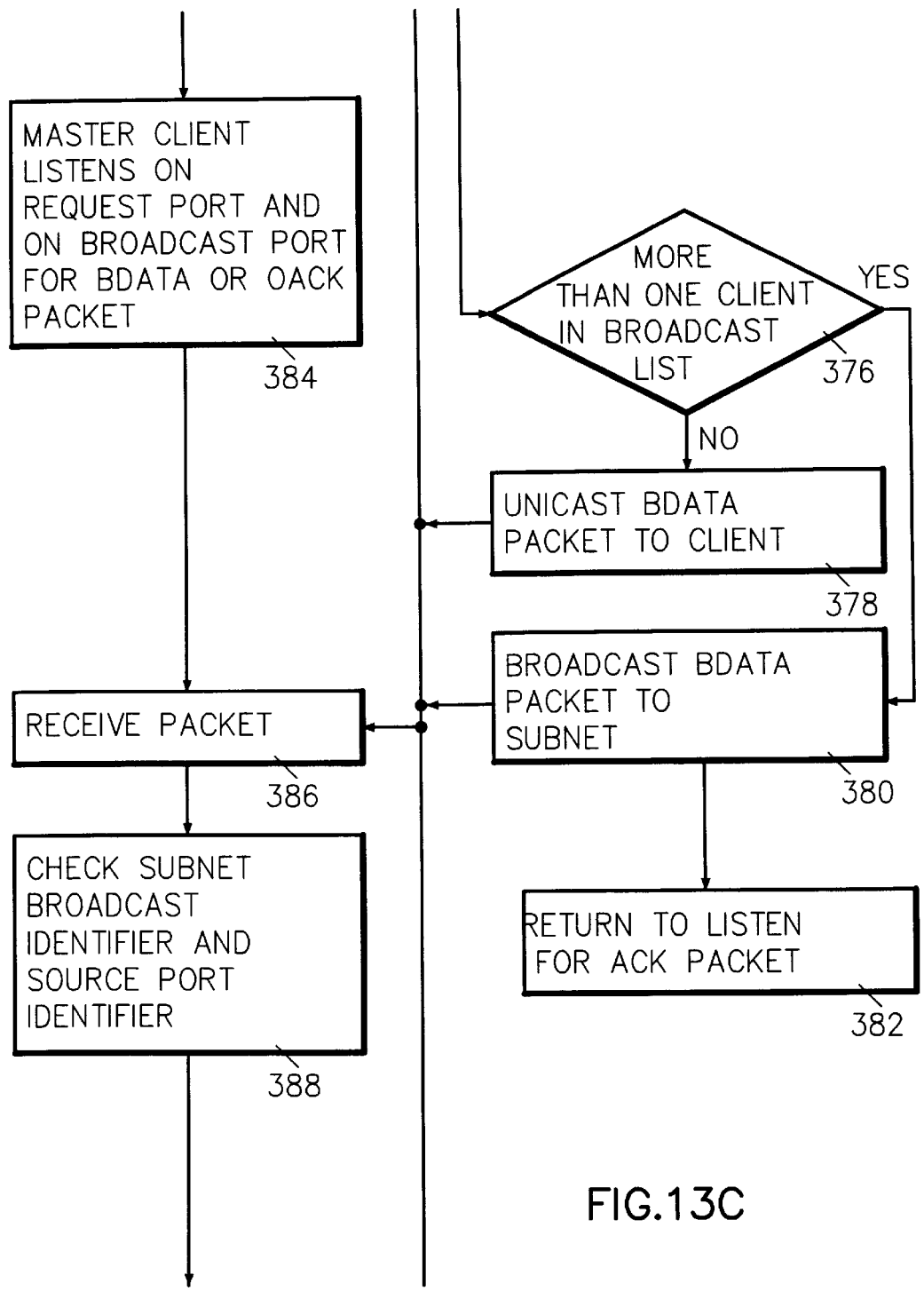
Figure 13D:
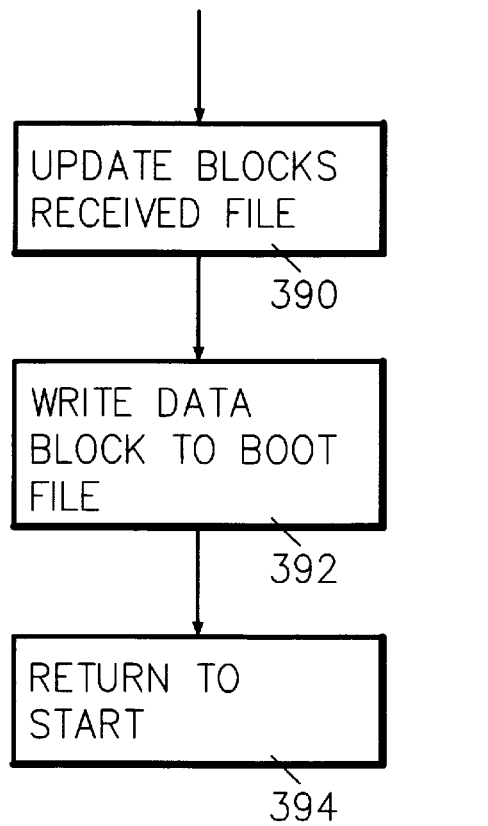

If it is determined in step 404 that in step 402, passive client receives an OACK packet with MC=1, this passive client has been designated as the master client, and processing transfers in step 406 to step 350 (FIG. 13A). Otherwise, in steps 408 and 410, passive client updates its blocks received file 141, writes the data block to boot file 123, and in step 412 returns to step 402 to listen for the next BDATA packet.

TFTP broadcast capable client 154 passes its subnetwork mask 230 as part of the initial RRQ 182. Subnet mask 230 is used by TFTP server 110 to determine whether an existing broadcast to the that subnet 106 can be joined or if a new server 130 must be started to broadcast the requested file 120 to that subnet 106.

Client 154 can also request the transfer size option 232 to determine the amount of memory 123 needed to store file 120. Client 154 can also calculate the last block number k (that is, transfer size 232/block size 224+1) or client 154 can make a note of the block number received which is less the block size. Now as each block is received client 154 could index into the memory 123 using an algorithm (blkno 214−1*blksize 224). If client 154 becomes the controlling client, with MC bit 239 set to "1", it must acknowledge with ACK 186 each block n.

A block of bytes or memory mapped bits or bytes 141 are used to keep track of which blocks have been received.

If client 152 becomes a passive client (not the controlling client) it must receive each datagram 180, 206, use block number 214 to determine where to write into memory block 121, write the data into memory 121, and check that block in its map 141 of received blocks. When it becomes the active client it will receive an OACK 196 in a unicast datagram 180 from server 110 to the original IP/address port 139, 202 from which client 152 sent the RRQ to server 110 with the broadcast option 228 and string 236 in the OACK 196 will be set to ",,1". Then client 152 walks its map 141 of received blocks m to determine the starting block's position.

When client 152 determines it has received all of file 120 into file 121, it sends an ACK 186 with last block k indicated in block# field 214. This ACK 186 is sent to the source address and port 202, 204 from which the last server packet was received. This event will happen at a point m-1 partially through transfer of file 120 if client 152 has passively received blocks m through k when it joined a broadcast already in progress.

Figure 15:
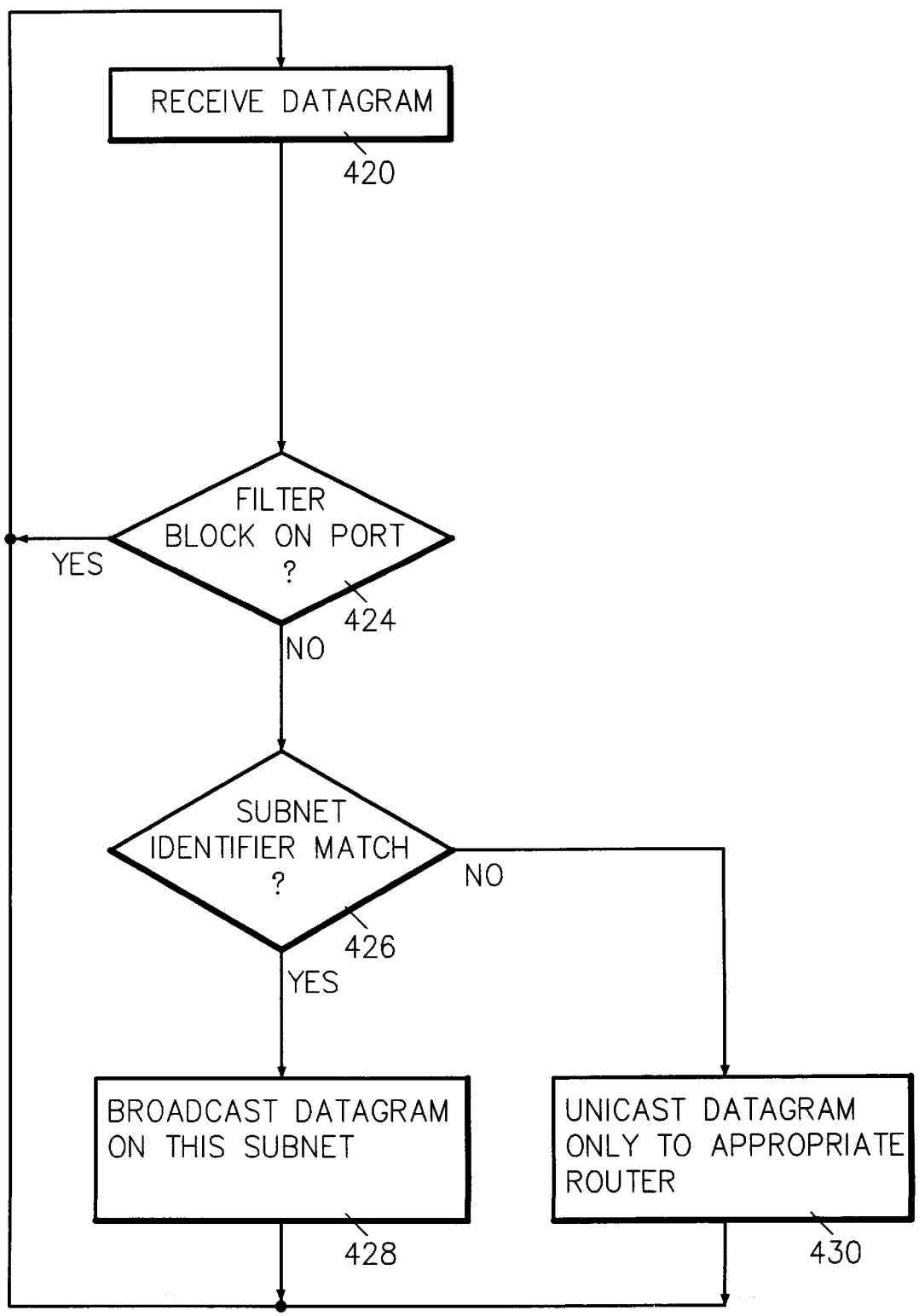
FIG. 15 is a process flow diagram of the method executed at a network station gateway bridge or router.

Referring to FIG. 15, the method steps executed at each router, such as router B 112, will next be described.

In step 420, router 112 receives a BDATA 198 datagram.

In step 424, router 112 determines if the source port is blocked by filter 129 and, if so, terminates processing and returns to step 420 to await the next datagram.

In step 426, if filter 129 allows processing of datagrams received from this source port, router 112 determines if the destination subnet matches a subnet connected to this router 112. If there is a match, in step 428 router 112 broadcasts the datagram on this subnet to clients 132, 134 and 136. If there is not a match, in step 430 router 112 unicasts the datagram to router 114 or 116, whichever is appropriate for the destination subnet.

Advantages over the Prior Art

The advantages of the preferred embodiment of this invention include an improved system and method for file transfer to multiple clients which allow the source IP address to vary.

It is a further advantage of the invention that there is provided an improved file transfer to multiple clients which allows the source IP address to vary to accommodate multiple IOPS and load balancing.

It is a further advantage of the invention that file transfer on a subnet basis is provided so as to maximize file transfer rates on a particular subnet, there being no gating by a client on a slower subnet path.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for booting diskless client workstations by subnet broadcasting load programs to a plurality of client workstations including a master client workstation and all passive client workstations that join a subnet broadcast files transfer group to reliably reconstitute at said plurality of client workstations a file of said load Programs for booting said plurality of client workstations transmitted from a server as a plurality of subnet broadcast datagrams, comprising the steps of:

- operating a subnet broadcast server to transfer datagrams including said load programs together with a subnet broadcast identifier and source port identifier to both said master client workstation and said passive client workstations on a subnet basis;
- operating gateways at subnets not matching said subnet broadcast address to unicast said datagram to a next gateway;
- operating said master client workstation and said passive client workstations responsive to said subnet broadcast identifier and server's source port for determining whether a received datagram is part of a transfer of interest to said client;
- operating routers connected to destination subnets to data link layer broadcast unicasted datagrams from an intervening subnet to all neighbors on the matching subnet while disregarding forwarding this data link layer broadcast to any adjoining subnets; and
- operating a passive client workstation on said matching subnet to track received datagrams and upon said client becoming a master client workstation to request missing datagrams in ascending order by including in acknowledge packets a block number equal to or greater than the last block transmitted by said server.

2. System for transfer of an executable file to multiple clients for execution, each said client being a user workstation, comprising:

- a server for sending data packets directed from one of a plurality of source ports, each said data packet including at least one block of said executable file including a plurality of blocks;
- a first router to a first subnet for receiving and selectively sending said data packets from said server;
- a second router to a second subnet and on said first subnet for receiving and selectively sending said data packets, said subnet including a least a master client and a passive client; each said client including:
  - a store for filing said executable file;
  - a store for tracking which of said blocks have been received; and
  - logic responsive to subnet broadcast identifier and packet source port for determining whether said data packet is part of a file of interest to said client;
- each said passive client being operable upon becoming a new master client for requesting of said server communication of any missing blocks in ascending order in a manner not requiring negative acknowledgments by including within acknowledge packets a block number equal to or greater than the last block transmitted by said server; and
- said second router including a filter for identifying from which of said source ports packets will be accepted for broadcasting to said clients.

3. A system for transfer of a file for execution at multiple clients including a master client workstation and at least one Passive client workstation, comprising:

- a first router to a first subnet for receiving and selectively sending file packets from a server; said first subnet including a least said master client and said passive client; each said client including:
  - a receiver for accepting packets selectively including first acknowledge packets and data packets sourced from one of a plurality of source ports, each said data packet including at least one block of a file including a plurality of blocks;
  - a store file for storing said blocks;
  - a track file for tracking which of said blocks have been received;
  - code responsive to the server source port and a subnet broadcast identifier for determining if a received block is of interest to said client; and
- each said passive client being operable upon becoming a new master client for requesting of said server communication of any missing blocks by way of transmission of acknowledge packets including a block number which is greater than or equal to that of the last block transmitted by said server.

4. The system of claim 3, each said client further comprising:

- a controller for communicating to a request port a read request packet requesting said file with subnet broadcast option and to said source port a client acknowledge packet for acknowledging receipt of a block.

5. The system of claim 4, said controller of each said client further operable for accepting a source acknowledge packet sourced from said request port and including master client indicia for identifying a receiving client as a master client or as a passive client.

6. The system of claim 5, the controller of said master client responsive to receipt of a source acknowledge packet including master client indicia for determining from its track file a next required data packet and sending to said source port in response to receiving each said data packet a client acknowledge packet identifying the next data packet required.

7. The system of claim 6, the controller of said master client being further responsive to said track file indicating all of said data blocks comprising said file have been received for sending to said source port a client acknowledge packet terminating said master client as the master client.

8. The system of claim 5, the controller of said passive client responsive to receipt of a source acknowledge packet including passive client indicia for receiving said data packets and updating its track file for tracking which data packets have been received.

9. The system of claim 8, the controller of said passive client being further operable to monitor its request port for a source acknowledge packet including master client indicia, and responsive to receipt of said master client indicia to determine from its track file the next data packet required by said passive client, and to send to said source port a client acknowledge packet identifying said next data packet.

10. A system for transfer of a file for execution to multiple clients including a master client workstation and at least one passive client workstation, comprising:

- a subnet broadcast server;
- a first router to a first subnet for receiving and selectively sending file packets from said server; said first subnet including a least said master client workstation and said passive client workstation; each said client including:
  - a receiver for accepting file packets selectively including first acknowledge packets and data packets sourced from one of a plurality of source ports, each said data packet including at least one block of a file including a plurality of blocks;

a store file for storing said blocks;

code responsive to source port indicia and a subnet broadcast identifier for determining of a received packet is of interest to said client;

a track file for tracking which of said blocks have been received for use by said client;

and upon said passive client workstation becoming a new master client workstation, for generating an acknowledgment message for requesting transmission of a missing block in ascending order; and said subnet broadcast server being selectively operable responsive to a request read packet from said master client workstation on a first request port for responding from said first request port with a server acknowledge packet including indicia designating said master client workstation as the master client and a broadcast server port;

said subnet broadcast server being selectively operable responsive to a request read packet from said passive client workstation on a second request port for responding from said second request port with a server acknowledge packet including indicia designating said passive client workstation as a passive client and said broadcast server port; and said subnet broadcast server being selectively operable responsive to a client acknowledge packet from said master client terminating broadcasts of data packets to said master client for responding from said second request port with a server acknowledge packet including indicia designating said passive client workstation as new master client workstation.

11. A program storage device readable by a machine, tangibly embodying a program of instructions executable by a machine to perform method steps for transfer of a file for execution at multiple clients, said method steps comprising:

receiving and selectively broadcasting said packets from a server to all clients, including a master client and a passive client, on a subnet; each said client being operable for:

determining whether a received packet is part of a file of interest to said client;

accepting packets selectively including source acknowledge packets and data packets sourced from one of a plurality of source ports, each said data packet including at least one block of a file including a plurality of blocks;

storing said blocks;

tracking which of said blocks have been received; and upon said passive client becoming a new master client, requesting in ascending order those of said blocks which have not been received.

12. A method for transfer of a file for execution at multiple clients, comprising:

operating a first router to a first subnet to receive and selectively send said packets from a server to all clients on said first subnet; said first subnet including a least a master client and a passive client; each said client operable for:

determining based upon server source port and subnet broadcast identifer whether a received packet is part of a file of interest to said client;

accepting packets selectively including first acknowledge packets and data packets sourced from one of a plurality of source ports, each said data packet including at least one block of said file including a plurality of blocks;

storing said blocks at said clients to form said file for execution at said client;

tracking which of said blocks have been received;

upon said passive client becoming a new master client, requesting transmission in ascending order from said server of those of said blocks which have not been received.

13. The method of claim 12, each said client further operable for performing the steps of:

communicating to a request port a read request packet requesting said file with subnet broadcast option and to said source port a client acknowledge packet for acknowledging receipt of a block.

14. The method of claim 13, said controller of each said client further operable according to the step of:

accepting a source acknowledge packet sourced from said request port and including master client indicia for identifying a receiving client as said master client or as said passive client.

15. The method of claim 14, the controller of said master client being responsive to receipt of a source acknowledge packet including master client indicia for performing the steps of:

determining a next required data packet and sending to said source port in response to receiving each said data packet a client acknowledge packet identifying the next data packet required.

16. The method of claim 15, the controller of said master client being further responsive to said track file indicating all of said data blocks comprising said file have been received for performing the step of:

sending to said source port a client acknowledge packet terminating said master client as the master client.

17. The method of claim 13, the controller of said passive client responsive to receipt of a source acknowledge packet including passive client indicia for performing the steps of:

receiving said data packets, and tracking which data packets have been received.

18. The method of claim 17, the controller of said passive client further performing the steps of:

monitoring its request port for a source acknowledge packet including master client indicia, and responsive to receipt of said master client indicia determining the next data packet required by said passive client, and sending to said source port a client acknowledge packet identifying said next data packet.

* * * * *